US007910794B2

(12) United States Patent
Quinn et al.

(10) Patent No.: US 7,910,794 B2
(45) Date of Patent: Mar. 22, 2011

(54) DISPOSABLE DIAPER CONSTRUCTION AND ADHESIVE

(75) Inventors: Thomas H. Quinn, St. Paul, MN (US); William L. Bunnelle, Ham Lake, MN (US)

(73) Assignee: Adherent Laboratories, Inc., Woodbury, MN (US)

( * ) Notice: Subject to any disclaimer, the term of this patent is extended or adjusted under 35 U.S.C. 154(b) by 895 days.

(21) Appl. No.: 11/681,887

(22) Filed: Mar. 5, 2007

(65) Prior Publication Data

US 2008/0221546 A1    Sep. 11, 2008

(51) Int. Cl.
*A61F 13/15* (2006.01)
*A61F 13/20* (2006.01)
*C08L 23/00* (2006.01)
*C08L 25/00* (2006.01)
*C08L 93/00* (2006.01)

(52) U.S. Cl. ............ 604/358; 524/274; 526/348.5
(58) Field of Classification Search ............ 604/358, 604/378; 524/272, 274, 556; 525/330.3
See application file for complete search history.

(56) References Cited

U.S. PATENT DOCUMENTS

| | | | |
|---|---|---|---|
| 3,181,765 A | 5/1965 | Bonzagni et al. |
| 3,573,125 A | 3/1971 | Elliott |
| 3,965,062 A | 6/1976 | Stiles |
| 4,028,292 A | 6/1977 | Korpman |
| 4,136,699 A | 1/1979 | Collins et al. |
| 4,140,733 A | 2/1979 | Meyer, Jr. et al. |
| 4,299,745 A | 11/1981 | Godfrey |
| 4,416,749 A | 11/1983 | Mahr et al. |
| 4,452,942 A | 6/1984 | Shida et al. |
| 4,460,364 A | 7/1984 | Chen et al. |
| 4,460,728 A | 7/1984 | Schmidt, Jr. et al. |
| 4,476,180 A | 10/1984 | Wnuk |
| 4,481,250 A | 11/1984 | Cook et al. |
| 4,497,941 A | 2/1985 | Aliani et al. |
| 4,501,779 A | 2/1985 | Hsu et al. |
| 4,526,577 A | 7/1985 | Schmidt, Jr. et al. |
| 4,541,983 A | 9/1985 | Hsu et al. |
| 4,587,289 A | 5/1986 | Comert et al. |
| 4,590,106 A | 5/1986 | Hsu et al. |
| 4,627,847 A | 12/1986 | Puletti et al. |
| 4,659,785 A | 4/1987 | Nagano et al. |
| 4,670,349 A | 6/1987 | Nakagawa et al. |
| 4,671,987 A | 6/1987 | Knott et al. |
| 4,743,238 A | 5/1988 | Colon et al. |
| 4,745,026 A | 5/1988 | Tsukahara et al. |
| 4,774,144 A | 9/1988 | Jachec et al. |
| 4,792,488 A | 12/1988 | Schirmer |
| 4,813,947 A | 3/1989 | Korpman |
| 4,842,947 A | 6/1989 | Jachec et al. |
| 4,880,696 A | 11/1989 | Yanidis |
| 4,895,567 A | 1/1990 | Colon et al. |
| 4,902,553 A | 2/1990 | Hwang et al. |
| 4,909,390 A | 3/1990 | Raine et al. |
| 4,929,509 A | 5/1990 | Godfrey |
| 4,935,089 A | 6/1990 | Schirmer |
| 4,935,271 A | 6/1990 | Schirmer |
| 4,956,207 A | 9/1990 | Kaufman et al. |
| 4,963,427 A | 10/1990 | Botto et al. |
| 4,983,435 A | 1/1991 | Ueki et al. |
| 4,983,652 A | 1/1991 | Agarwal |
| 5,055,526 A | 10/1991 | Sato et al. |
| 5,061,262 A | 10/1991 | Chen et al. |
| 5,064,492 A | 11/1991 | Friesch |
| 5,066,694 A | 11/1991 | Agarwal et al. |
| 5,066,711 A | 11/1991 | Colon et al. |
| 5,075,143 A | 12/1991 | Bekele |
| 5,120,787 A | 6/1992 | Drasner |
| 5,149,741 A | 9/1992 | Alper et al. |
| 5,180,784 A | 1/1993 | Ohmae et al. |
| 5,183,706 A | 2/1993 | Bekele |
| 5,198,494 A | 3/1993 | Kawachi et al. |
| 5,225,482 A | 7/1993 | Nakagawa et al. |
| 5,240,544 A | 8/1993 | Tanimoto et al. |
| 5,244,962 A | 9/1993 | Plamthottam et al. |
| 5,286,781 A | 2/1994 | Gotoh et al. |
| 5,296,552 A | 3/1994 | Ohmae et al. |
| 5,310,803 A | 5/1994 | Hansen |
| 5,328,734 A | 7/1994 | Morese-Seguela et al. |
| 5,331,033 A | 7/1994 | Stauffer et al. |
| 5,340,863 A * | 8/1994 | Krutzel ................. 524/272 |

(Continued)

FOREIGN PATENT DOCUMENTS

GB    2 282 155 B    6/1997

(Continued)

OTHER PUBLICATIONS

Davey, C., "EVA and E-MA Melt Blown Webs as Elastic and Adhesive Structural Components," *Book of Papers* The International Nonwovens Technological Conference, pp. 232-237 (May 18-21, 1987). Eastman, E. et al., "Polyolefin and Ethylene Copolymer-based Hot Melt Adhesives," *Handbook of Adhesives*, 3rd Edition, Chapter 23, pp. 408-422 (1990).
ESCORENE™ Ultra MV Ethylene Vinyl Acetate Copolymer for Adhesive and Sealant Applications MV 02520, 1 page (Oct. 19, 1999).
ESCORENE™ Ultra MV Ethylene Vinyl Acetate Copolymer for Adhesive and Sealant Applications MV 02528, 1 page (Oct. 19, 1999).
ESCOREZ™ Tackifying Resins Escorez 5300 Series, 2 pages (Feb. 2004).
ESCOREZ™ Tackifying Resins Escorez 5490 Product Technical Data Sheet, 1 page (Sep. 2004).
ESCOREZ™ Tackifying Resins Escorez 5600 Series, 2 pages (May 2003).

(Continued)

*Primary Examiner* — Melanie J Hand
(74) *Attorney, Agent, or Firm* — Pauly, DeVries Smith & Deffner, L.L.C.

(57) ABSTRACT

A novel spray-on adhesive composition is made from a high melt index polymer and a rosin ester tackifier that interact to produce a composition that can form a low VOC, non-tacky, hot melt adhesive material that can be used in disposable article manufacture. The adhesive provides surprisingly high initial adhesion. Additionally, the adhesive is thermally stable at hot melt application conditions, low in cost, easily applied, and produces high quality disposable articles.

13 Claims, No Drawings

U.S. PATENT DOCUMENTS

| | | | |
|---|---|---|---|
| 5,352,717 A | 10/1994 | Bergishagen | |
| 5,411,786 A | 5/1995 | Kuo | |
| 5,454,909 A | 10/1995 | Morganelli | |
| 5,455,111 A | 10/1995 | Velasquez Urey | |
| 5,500,472 A | 3/1996 | Liedermooy et al. | |
| 5,512,124 A | 4/1996 | Hansen | |
| 5,532,306 A | 7/1996 | Kauffman et al. | |
| 5,548,014 A | 8/1996 | Tse et al. | |
| 5,591,792 A | 1/1997 | Hattori et al. | |
| 5,605,720 A | 2/1997 | Allen et al. | |
| 5,620,758 A | 4/1997 | Babrowicz | |
| 5,670,566 A | 9/1997 | Liedermooy et al. | |
| 5,685,758 A | 11/1997 | Paul et al. | |
| 5,695,855 A | 12/1997 | Yeo et al. | |
| 5,738,669 A | 4/1998 | Suzuki et al. | |
| 5,738,930 A | 4/1998 | Huskey | |
| 5,786,418 A | 7/1998 | Strelow et al. | |
| 5,804,519 A | 9/1998 | Riswick et al. | |
| 5,843,260 A | 12/1998 | Huskey | |
| 5,853,864 A | 12/1998 | Bunnelle | |
| 5,877,259 A | 3/1999 | Kveglis et al. | |
| 5,928,782 A | 7/1999 | Albrecht | |
| 5,942,569 A | 8/1999 | Simmons et al. | |
| 5,965,255 A | 10/1999 | Ichimura et al. | |
| 5,981,035 A | 11/1999 | Eshleman | |
| 5,994,437 A | 11/1999 | Lebez et al. | |
| 6,015,625 A | 1/2000 | Morizono et al. | |
| 6,024,822 A | 2/2000 | Alper et al. | |
| 6,063,493 A | 5/2000 | Saitou et al. | |
| 6,107,430 A * | 8/2000 | Dubois et al. | 526/348.5 |
| 6,117,945 A | 9/2000 | Mehaffy et al. | |
| 6,120,887 A | 9/2000 | Werenicz et al. | |
| 6,120,899 A | 9/2000 | Cameron et al. | |
| 6,127,595 A | 10/2000 | Makoui et al. | |
| 6,143,818 A | 11/2000 | Wang et al. | |
| 6,183,863 B1 | 2/2001 | Kawachi et al. | |
| 6,184,285 B1 | 2/2001 | Hatfield et al. | |
| 6,210,765 B1 | 4/2001 | Tanaka et al. | |
| 6,221,448 B1 | 4/2001 | Baetzold et al. | |
| 6,228,504 B1 | 5/2001 | Sawada et al. | |
| 6,235,818 B1 | 5/2001 | Morizono et al. | |
| 6,288,149 B1 | 9/2001 | Kroll | |
| 6,300,398 B1 | 10/2001 | Jialanella et al. | |
| 6,319,979 B1 | 11/2001 | Dubois et al. | |
| 6,333,119 B1 | 12/2001 | Mito et al. | |
| 6,387,471 B1 | 5/2002 | Taylor et al. | |
| 6,406,767 B1 | 6/2002 | Mueller | |
| 6,430,898 B1 | 8/2002 | Remmers et al. | |
| 6,433,069 B1 | 8/2002 | Oeltjen et al. | |
| 6,443,936 B1 | 9/2002 | Hamilton et al. | |
| 6,491,776 B2 | 12/2002 | Alper et al. | |
| 6,506,185 B1 | 1/2003 | Sauer et al. | |
| 6,534,572 B1 | 3/2003 | Ahmed et al. | |
| 6,547,915 B2 | 4/2003 | Taylor et al. | |
| 6,548,579 B2 | 4/2003 | Reski et al. | |
| 6,568,399 B1 | 5/2003 | Wieczorek, Jr. et al. | |
| 6,579,915 B2 | 6/2003 | Kroll et al. | |
| 6,582,829 B1 | 6/2003 | Quinn et al. | |
| 6,632,541 B2 | 10/2003 | Johoji et al. | |
| 6,656,601 B1 | 12/2003 | Kawachi et al. | |
| 6,773,808 B2 | 8/2004 | Ogawa et al. | |
| 6,833,404 B2 | 12/2004 | Quinn et al. | |
| 6,846,876 B1 | 1/2005 | Quinn | |
| 6,946,528 B2 | 9/2005 | Domine et al. | |
| 2002/0115744 A1 | 8/2002 | Svenningsen et al. | |
| 2002/0161085 A1 | 10/2002 | Gibes et al. | |
| 2003/0139516 A1 | 7/2003 | Quinn et al. | |
| 2004/0162396 A1 * | 8/2004 | Chu et al. | 525/330.3 |
| 2004/0236002 A1 | 11/2004 | Hassan et al. | |
| 2005/0003197 A1 | 1/2005 | Good et al. | |
| 2005/0014891 A1 * | 1/2005 | Quinn | 524/556 |
| 2005/0042469 A1 | 2/2005 | Gong et al. | |
| 2005/0049342 A1 | 3/2005 | Albrecht et al. | |
| 2005/0056367 A1 | 3/2005 | Quinn | |
| 2005/0112372 A1 | 5/2005 | Rolland et al. | |
| 2005/0137303 A1 | 6/2005 | Shelby et al. | |
| 2005/0261416 A1 | 11/2005 | Morrison et al. | |
| 2006/0135694 A1 | 6/2006 | Vaughan et al. | |

FOREIGN PATENT DOCUMENTS

| | | |
|---|---|---|
| WO | WO 96/03470 A1 | 2/1996 |
| WO | WO 00/00565 | 1/2000 |
| WO | WO 01/34719 A1 | 5/2001 |

OTHER PUBLICATIONS

KRATON™ Material Safety Data Sheet, 7 pages.
LOTRYL® EH in Hot Melt Adhesive Applications, 11 pages (Apr. 2002).
Raykovitz, G., "Adhesive Coatings for Non-Wovens," *2nd International PIRA conference*, vol. 2, pp. 1-4 (Nov. 28-30, 1989).
SEPTON™ Product Data Sheet, 13 pages.

* cited by examiner

DISPOSABLE DIAPER CONSTRUCTION AND ADHESIVE

FIELD OF THE INVENTION

The invention relates to an adhesive and to a composite article made by constructing, laminating or otherwise joining components with the adhesive. In one embodiment, a sprayable hot melt adhesive composition contains a novel blend of thermoplastic copolymer and a compatible tackifying resin. The composition has a unique combination of properties in that it is a non-tacky hot melt composition that provides very high initial adhesion. The adhesion level is stable with heat aging, and the composition at the application temperature is also stable over time. In a second embodiment, a disposable article can be constructed or made by adhesively bonding layers including a film, a woven or non-woven fabric, tissue or sheet to a sheet-like material using the novel hot melt adhesive that can be variously applied or can be sprayed. The construction adhesive of the invention is used to bind the components in a mechanically stable article or to join the outer cover to the absorbent. Disposable articles such as an infant or adult diaper and can be made with this adhesive material.

BACKGROUND OF THE INVENTION

Disposable articles and their construction materials including fabrics, films, and adhesives are described in a variety of United States patents. Adhesives for such articles have been developed. In initial work, Korpman, U.S. Pat. No. 4,028,292, teaches a heat resistant adhesive material comprising a reactive phenol formaldehyde resin and a suitable antioxidant of a metal dithiocarbamate. Collins et al., U.S. Pat. No. 4,136,699, teach a disposable article using a hot melt ABA block polymer containing pressure sensitive adhesive as a positioning and construction material. Similarly, Chen et al., U.S. Pat. No. 4,460,364, teach a hot melt PSA used in the disposables. Schmidt, Jr. et al., U.S. Pat. No. 4,526,577, teach SBS block copolymers system in disposables using multiline application technology. Puletti et al., U.S. Pat. No. 4,627,847, also teach the use of hot melts in disposables. Tsukahara, U.S. Pat. No. 4,745,026, teaches a delayed tack sheet using an aqueous dispersion of, e.g., a polymer, a solid plasticizer and preferably a tackifier. Quinn et al., U.S. Patent Publication No. US 2003/0139516 A1 teach certain hot melt adhesives utilizing a very broad range of materials. Quinn et al., U.S. Pat. No. 6,582,829 teach certain hot melt adhesives utilizing an ethylene α-olefin (EAO) polymer. The application discloses a very broad range of materials. Dubois et al, U.S. Pat. No. 6,107,430 teach a broad range of proposed formulations and teaches a 1000 melt index ethylene octene polymer (one type of EAO) combined with a tackifying resin, a wax and an antioxidant material. Werenicz et al., U.S. Pat. No. 6,120,887 teach hot melt adhesive compositions using, on the whole, exemplary materials generally containing less than 40% of a low MI (high molecular weight) polymer material. Jialanella et al., U.S. Pat. No. 6,300,398 relates to an ethylene α-olefin polymer mixture with a wax and a nucleating agent to improve elongation at break of the polymer material. While the disclosure mentions the use of these materials in adhesives, no specific formulatory strategies are shown in the reference. Polymer compositions in the form of mixtures of materials are shown in the patent from Column 20, line 50 through Column 24, line 27. Dubois et al., U.S. Pat. No. 6,319,979 teach low application temperature hot melt adhesives including an ethylene α-olefin polymer material. The patent has a very broad disclosure, but discloses exemplary materials beginning at Column 25, line 62 through Column 30, line 36. As a whole, the materials have less than 33% of the ethylene octene polymer (having a 1000 gm-10 $\text{min}^{-1}$ melt index). Table III in Column 28 further shows additional examples using certain polymeric materials with a melt index (MI) of 500 or 1000 grams-10 $\text{min}^{-1}$ and in amounts less than 33 wt-%. Ahmed et al., U.S. Pat. No. 6,534,572 show compositions comprising a thermoplastic component and a superabsorbent polymer material. Kroll et al., U.S. Pat. No. 6,579,915 teach certain radiation crosslinked or curable hot melt adhesives utilizing low application temperatures. The application discloses a very broad range of materials, but uses a vinyl modified block polymer, KX-222CS. The vinyl substituent on the block polymer is used for radiation cross-linking.

In general, hot melt adhesives are formulated to contain at least a polymer and a tackifying resin, but can include a diluent, a stabilizer and other components. (Raykovitz, "Adhesive Coatings for Non-Wovens," Proceedings of the $2^{nd}$ International PIRA Conference, November 1989, p. 1.) The main function of the polymer is to provide strength as well as aid in adhesion. The tackifier promotes adhesion and wetting and contributes to adhesive tack. Commonly used tackifiers are rosins, modified rosins, terpenes, and hydrocarbons. The diluent promotes wetting and reduces the viscosity of the formulation. Mineral oil and wax are commonly used diluents. The stabilizer maintains viscosity, color, and physical properties as well as preventing thermal degradation. Hindered phenols, phosphites, and thioesters are commonly used stabilizers.

Ethylene-vinyl acetate copolymers (EVAs) are also widely used as adhesive resins along with tackifiers and plasticizers. Traditional hot melt blends incorporate copolymers having vinyl acetate content of 18 to 40% into formulations comprising 30 to 40 wt % EVA, 30 to 40 wt % tackifying resin, and 20 to 30% petroleum wax. (Skeist, I. ed., *Handbook of Adhesives*, $3^{rd}$ ed., ©1990 by Van Nostrand Reinhold, N.Y., 408-22, 409.) The EVA provides strength and toughness to the adhesive, the tackifier provides surface wetting and tack, and the wax is used to lower the melt viscosity, reduce cost, and control speed of application of the adhesive. Often, plasticizers are included as well, depending on the application. While the melt index of EVA polymers ranges widely, traditionally these copolymers do not have melt index above about 500. Higher vinyl acetate content in the copolymer increases solubility, flexibility, hot tack, adhesion, and improves low temperature performance. Lower vinyl acetate content, however, leads to improved seal strength, increased resistance to blocking, and increased paraffin solubility while decreasing the properties boosted by higher vinyl acetate content. Thus, in any given application, a tradeoff is made with regard to vinyl acetate content depending on which properties are the most desirable or necessary.

A common group tackifiers employed in hot melt adhesive formulations with EVA is the rosin ester group. Because they impart compatibility to other components of a formulation, these tackifiers find utility as broadening the scope of other possible additives in an EVA formulation. Three basic types of rosin are available, all being natural products derived from tree byproducts. Gum rosin is derived from living pine trees, while wood rosin is harvested from aged pine stumps. Tall oil rosin is a byproduct of papermaking processes and as such has the largest source of supply. Unmodified rosins are highly unsaturated and thus are subject to degradation by UV, heat, and oxygen. Thus, industrially useful rosins are hydrogenated, disproportionated, and/or dimerized and then esterified. Glycerin and pentaerythritol are the most common esterification agents. Esterified rosins generally exhibit good adhesion, low color, good heat stability, and good aging stability.

Recently manufacturers have strived to meet new demands for hot melt adhesive technology by applying a number of different strategies to the traditional EVA hot melt formulation technology. The traditional strength of EVA hot melt adhesive technology is its relative low cost and wide range of utility. Improvements are continually made in this area, with an eye toward lowering cost or improving product performance, e.g. low temperature utility, increasing speed of application, lowering application temperature, increasing tack, etc. Specialty adhesives formulated for specific applications are also seen in the art.

In furthering the general utility of EVA based hot melt adhesives, Schmidt Jr. et al, U.S. Pat. No. 4,460,728, disclose that a combination of EVA and atactic polypropylene with tackifier, plasticizer, petroleum wax, and a stabilizer provide good processing and adhesive properties combined with a lower cost due to the inclusion of polypropylene. The formulation is employed in disposable diaper products. Korpman, U.S. Pat. No. 4,813,947 discloses a hot melt composition for bonding a tape tab to e.g. a diaper, such that the tab is reversibly adhered to a pressure sensitive adhesive; repeated opening and closing of the adhesive to tab does not result in failure of the adhesion of the tab to the diaper. The formulation employs an ABA block copolymer, a second polymer that may be EVA, a tackifier, and a hot melt modifying resin. In a similar application, Chen et al., U.S. Pat. No. 5,061,262 disclose a hot melt adhesive with an elongation of 100% at break to accomplish the same goal of retaining a tape on a diaper for repeated opening and resealing. The formulation employs two EVA polymers, one having 18-40 wt % vinyl acetate and the second having 14-20 wt % vinyl acetate; a tackifier, and microcrystalline wax.

Riswick et al., U.S. Pat. No. 5,804,519 disclose a method of improving the strikethrough properties of, among others, EVA based hot melt adhesives by adding 0.10 to 10 parts by weight of a fluorochemical surfactant based on the weight of the adhesive formulation. This advantage is useful in disposable absorbent articles, i.e. diapers and the like. The increased hydrophilicity of the adhesive enhances the transfer of liquid from the skin contact layer to the absorbent fluff layer underneath, where the adhesive resides between the layers. Similarly, Gibes et al., U.S. Patent Publication No. US 2002/0161085 discloses a hot melt adhesive with a hydrophile-lipophile balance (HLB) of less than 15, for the purpose of enhancing liquid transfer by the adhesive into the absorptive layers of a disposable absorptive article. Kauffman et al., U.S. Pat. No. 5,532,306 disclose a hydrophilic hot melt adhesive that will release upon exposure to moisture. The formulations optionally include EVA copolymer in addition to ABA lineal or radial block copolymer, and a water soluble or dispersible plasticizer, and other optional ingredients.

Simmons et al., U.S. Pat. No. 5,942,569 discloses the use of a pelletizing agent that can be added to tacky, pressure sensitive hot melt adhesives comprising EVA, among others, to provide for storage of the formulated adhesive in pellet form. The compositions comprise at least a thermoplastic polymer (e.g. EVA), tackifier, plasticizer, and a pelletizing aid that is, for example, polyethylene wax, polyamide wax, or a stearamide wax. Wang et al., U.S. Pat. No. 6,143,818 disclose a hot melt adhesive formulation that is a modified ethylene-propylene copolymer rubber (EPR) or ethylene-propylene-diene monomer copolymer rubber (EPDM), wherein the modification is to include a semicrystalline polymer such as EVA to the mixture of the rubber, along with a tackifier and optionally plasticizer, wax, stabilizer, antioxidant, and/or filler. The EVA provides cohesive strength to the formulation so that the addition of covalent crosslinkers, typically required for EPR and EPDM adhesives, is obviated. One disclosed use of these formulations is as a sprayable adhesive for elastic attachment in nonwoven disposable articles.

Many advances in EVA hot melt art are directed to specialty applications. For example, Colon et al., U.S. Pat. Nos. 4,743,238, 4,895,567, and 5,066,711 disclose hot melt adhesives that provides a wetness indicating property. The formulation can contain EVA, in addition to water sensitive polymers such as polyvinylpyrrolidone or, alternatively, a surfactant. Also required is an acidic material, typically an acidic tackifier, and a color-based wetness indicating agent. Svenningsen, et al., U.S. Patent Publication No. US 2002/0115744 A1 disclose a method of including imparting antimicrobial properties to a hot melt adhesive formulation that includes a polymer, for example EVA, tackifier, plasticizer, wax, antioxidant, and 0.01-5 wt % of a bacteriostat based on the weight of the formulation. Such adhesives find utility in disposable nonwoven products such as diapers.

Still other advances in EVA hot melt technology are directed to adhesion to specific substrates. Godfrey, U.S. Pat. No. 4,299,745, discloses an EVA hot melt formulation with enhanced adhesion to polyethylene substrates, where the addition of a modified polyethylene with saponification number of 3 to 60 provides enhanced adhesion properties. Other required ingredients are EVA copolymer, tackifier, and microcrystalline wax. Yeo et al., U.S. Pat. No. 5,695,855 discloses a printable hot melt adhesive specifically for printing a durable pattern onto a polyolefin nonwoven. The formulation contains EVA of a particular range of viscosity and a pigment. Vaughan et al., U.S. Patent Publication No. US 2006/0135694 A1 discloses a means to improve adhesion of EVA based hot melt adhesives to substrates such as polyethylene films as provided in disposable nonwoven application. The improved adhesion is provided in a formulation having, at minimum, EVA with 10-30 wt % vinyl acetate, styrene-ethylene-butylene-styrene (SEBS) block copolymer having a styrene content of 10-25 wt %, and a tackifier.

Despite the advances made in EVA based hot melt adhesives for use in disposable articles, there remains a substantial need in this art to obtain relatively inexpensive hot melt adhesives with excellent initial adhesion of components to film when used in disposable diaper applications. To this end, there is a substantial need to provide a formulation with a minimum number of ingredients, low cost and ease of blending ingredients. Such formulations can minimize error in amounts added, order of addition, etc. This provides ease of use that minimizes waste and maximizes efficiency yet still provides very high adhesion.

A substantial need also exists to provide adhesives having a stable level of adhesion, such that aging of the adhesive does not lead to a change in adhesion level. A substantial need also exists to obtain a thermally stable hot melt adhesive formulation that withstands long residence times at application temperature without suffering from changing viscosity due to crosslinking, degradation, or other undesirable events. A substantial need also exists to obtain a non-tacky, pelletizable hot melt adhesive formulation having the desirable properties listed above, so that the formulation is easily stored. A substantial need also exists for hot melt adhesive formulations having low VOC content for the benefit of both the manufacturing site environment and the end user.

BRIEF DISCUSSION OF THE INVENTION

The adhesive composition, particularly suited for use with disposable constructions, consists essentially of an admixture of a relatively high melt index ethylene-vinyl acetate copolymer (EVA) resin with a relatively high-melting rosin ester. The EVA polymer provides the properties such as cohesiveness and strength. In this material relatively high melt or high viscosity tackifier is combined with relatively low molecular weight (high melt index) thermoplastic components to enhance the cohesive strength of the mixture while maintaining good processability The adhesive composition of the invention has all the desirable properties outlined above. The composition with its high initial adhesion is particularly useful for disposable diaper construction applications. The composition is pelletizable and once blended and cooled is not tacky. Pelletizable adhesives are relatively easy to package and use at the disposable assembly location. However, despite being nontacky, the adhesive provides excellent initial and aged adhesive properties, giving rise to substrate failure without failure of the adhesive. This combination of non-tackiness and very high initial adhesion is unique to the composition. Additionally, the fact that the adhesion does not appear to substantially change after heat aging means that the adhesion will be more consistent than other adhesives that build adhesion or lose adhesion during heat aging cycles and thus may also change during long-term storage of the formulated adhesive. The adhesive is also thermally stable in that it can be placed into application equipment and be maintained for a substantial period of time, 72 hours or more, at the application temperature prior to application.

The adhesive composition of the invention is also low in volatile organic compounds (VOCs) and therefore is low in odor, even at the application temperature. Low odor compositions substantially improve the working environment of workers who maintain equipment used in spraying the adhesive onto the workpiece. Further, the disposable articles, when removed from their packaging also have little or no detectable odor which can be unacceptable to many end users.

Lastly, the adhesive material of this invention is formulated to minimize cost, and maximize adhesive performance without any reduction in quality in the resulting disposable article. The formulation consists essentially of only two components, EVA copolymer and a tackifier, and thus is relatively simple in terms of compounding. Cost is low because of the inexpensive nature of the materials, as well as the ease of manufacture. Ease of manufacture means that less material is wasted to mistakes in amounts, order of addition, etc. Finally, cost is lowered by the ability to leave the formulation in a molten state without a change in viscosity, thus allowing larger batch sizes to be used.

A first embodiment of the invention is a hot melt, non-pressure sensitive, non-tacky, adhesive composition that provides high initial adhesion levels.

A second embodiment of the invention is a disposable article using the hot melt adhesive in a construction application.

A third embodiment of the invention is a method of using the hot melt of the invention to assemble a disposable article.

DETAILED DESCRIPTION OF THE INVENTION

The adhesive consists essentially of an admixture of a relatively high melt index ethylene-vinyl acetate copolymer (EVA) resin with a relatively high-melting rosin ester. The EVA polymer provides the properties such as cohesiveness and strength. In this material relatively high melt or high viscosity tackifier is combined with relatively low molecular weight (high melt index) thermoplastic components to enhance the cohesive strength of the mixture while maintaining good processability.

In production of disposables, the hot melt adhesive of the invention is typically extruded at elevated temperature onto the disposable. Layers of an absorbent, nonwoven, fabric or film can be added and fixed in place. Disposables with secure bonding that traps layers of absorbent, nonwoven, fabric or tissue in the HMA can be made because the adhesive can be extruded directly on the work piece. In recent years, increasing attention has been directed to development of sprayable hot melt adhesives. The work piece or substrate-manufacturing regimen can use a spray-on adhesive to increase productivity. Such spray-on adhesives are delivered from a plurality of narrow orifices in the form of fibers, threads or filaments having a substantially circular cross-section with a diameter less than 0.12 cm, typically about 0.02 to 0.002 cm. Fine line or spiral spray patterns are used. The spray-on adhesive takes on the form of fibers that have substantial surface area in comparison to the mass of the fiber. Typically, after spraying, the adhesives reach ambient temperatures upon immediate contact with the work piece. Extruded hot melt adhesives retain a significant amount of heat after application. Ambient temperature is the temperature of the surrounding environment and temperature of the disposable. In these construction applications, the disposable and the temperature of the environment are typically not substantially different. Sprayed adhesives take the form of a solid matrix formed as a result of the combined application adhesive fibers creating an overlapping distribution of threads or fibers on the disposable. Spray adhesive technology is used to make disposable articles by combining, e.g. a film with a woven or non-woven fabric with the adhesive and forming a bond between the substrates or layers by pressure. Such conventional spray-on adhesives form typically a laminated adhesive bonding with the film sheet and the fabric layers.

The adhesive consists essentially of an admixture of ethylene-vinyl acetate copolymer (EVA) resin with a relatively high-melting rosin ester tackifier. The EVA resin is 28% vinyl acetate and has a melt index of 800 when measured using ASTM D-1238. This copolymer is commercially available as ELVAX® 205W from the DuPont Company of Wilmington, Del. While ELVAX® 205W is particularly useful, other EVA copolymers having melt index of up to about 1000 as measured by ASTM D-1238 are also envisioned as useful in embodiments of the invention. The tackifier is a pentaerythritol ester of rosin having a melting point of 1° C. This tackifier was Sylvalite RE-100, from the Arizona Company of Jacksonville, Fla. The EVA material used in the invention can be derived from a single polymeric raw material or source material or can be a blend of two or more polymer materials or source materials obtained from raw material manufacturers. The weight ratio of EVA to pentaerythritol ester of rosin is about 60:40. The properties of these two materials used are shown in Tables 1 and 2, respectively.

TABLE 1

Typical properties of Elvax ® 205W Ethylene Vinyl Acetate Copolymer

| Resin Property | Units (SI) | Value |
| --- | --- | --- |
| Vinyl Acetate | wt % | 28 |
| Antiblocking agent | wt % | ≦0.6 |
| Melt Index 190° C. ASTM-1238 | g/10 min | 800 |
| Density ASTM D1505 | g/cm$^3$ | 951 |

TABLE 1-continued

Typical properties of Elvax ® 205W Ethylene Vinyl Acetate Copolymer

| Resin Property | Units (SI) | Value |
|---|---|---|
| Cloud point in paraffin wax (146 AMP fully refined) | ° F. (° C.) (° C.) | 151 (66) |
| Softening Point, R & B | ° F. (° C.) | 176 (80) |
| Hardness, 15s Shore A ASTM D-2240 | — | 75 |

TABLE 2

Properties of pentaerythritol ester of rosin Sylvalite RE-100L

| | Units | Value |
|---|---|---|
| Softening Point, Ring and Ball C | ° C. | 100 |
| Acid Number | | 12 |
| Solid Gardner Color | | 4 |
| Color, USDA | | XB |
| Brookfield Viscosity | | |
| At 150 C. | Cps | 955 cps |
| At 177 C. | Cps | 150 cps |

The composition of the present invention is preferably made by blending the ingredients in a molten state, followed by pelletizing, pillowing, or casting into molds or drums, etc., for subsequent remelting and application. Alternatively, the ingredients may be fed simultaneously at the appropriate rates into an extruder and the blend extruded directly onto a disposable diaper construction. It is an advantage of the invention that the adhesive formulation is easily blended. No special steps need be taken and no special order of addition or other parameters are required for formulate the adhesive. Additionally, only two components are required in the formulation of the invention; no plasticizers are required. Ease of formulation translates to lower cost and less waste in production.

Surprisingly, we have found that this blend of materials advantageously has very high initial adhesion, despite the low tack of the formulation. Initial adhesion is higher than that of other nontacky hot melt adhesives, as well as that of commercially available pressure sensitive adhesives typically used for disposable absorptive articles such as diapers. In our tests, adhesive was initially applied to laminate a disposable diaper olefin backing to a nonwoven fabric at a coating weight of 5 g-m$^{-2}$. This application level resulted in substrate failure, without adhesive failure, when a T-peel test peeled at 12 inches/minute was carried out; thus, the load exceeded 440 g of adhesion for a ¾" width of adhesive. Other hot melt adhesives and pressure sensitive adhesives used in commercial applications including disposable diaper applications have initial T-peel values (also at 5 g/m$^2$) ranging from about 140 g to about 240 g and do not cause substrate failure.

Additionally, the adhesion of the adhesive formulation of the present invention maintains this high level of adhesion after heat aging for two weeks at 49° C., again causing substrate failure when re-tested at 25° C. Thus, it is an advantage of the current invention that the adhesive provides adhesive properties that are not substantially altered by heat aging. Other adhesives we tested build adhesion over a heat aging cycle, but none exceeded about 360 g of adhesion and none cause substrate failure. This advantage is significant because, while pressure sensitive hot melt adhesives are known to build adhesion during aging tests, nontacky adhesives do not tend to build adhesion. However, other nontacky hot melt adhesives do not have high adhesion; these adhesives tend to remain stable at adhesion but over a range of only e.g. 150-250 g in a T-peel test. Thus, the overall adhesion of the composition of the invention is surprisingly high for a nontacky hot melt formulation, both before and after heat aging.

Another advantage of the adhesive of the invention is that it has very low volatile content. After 24 hours at 150° C., only 0.5 weight % of the adhesive was volatilized. After 48 hours at 150° C., less than 1 weight % was lost. Commercially available pressure sensitive adhesives, in particular, tend to have high volatile content and may lose as much as 5-10 weight % over 48 hours at 150° C. Volatile organic chemicals (VOCs) are increasingly recognized as undesirable aspects of many manmade products. This recognition is manifested in the increasing environmental regulation of products and manufacturing facilities where the products are made. Increasingly harsh maximum level thresholds of released VOCs are mandated for a vast array of products. Thus, it is a highly advantageous aspect of any new adhesive formulation that the VOC content is very low.

Another advantage of the adhesives of the invention is high thermal stability of the formulation. After 72 hours at 150° C., the blend builds viscosity by only about 3% compared to initial viscosity at 150° C. Pressure sensitive adhesives typically used in disposable diaper applications tend to build or lose viscosity over such a heating cycle, and may lose or gain 30% or more of their initial viscosity at 150° C.

The composition of the present invention may be applied by any hot melt application technique such as slot coating, spiral spraying, screen printing, foaming, engraved roller or melt blown adhesive application techniques. When applied in this manner, the inventive adhesive formulation may be present as a coating, fiber, non-woven web, or film layer on at least one substrate or as a portion of a disposable article. In one embodiment of the disposable article of the invention, typically at a minimum, comprises at least one film combined with a non-woven or woven fabric having a bonding layer of the adhesive of the material. The bonding layer can typically comprise a uniform layer, a spiral spray or a sprayed on or a fine line application of adhesive composition. The amount of adhesive combined with the film and the fabric is about 0.4 to 1.2 milligrams/lineal centimeter for Fineline applications and 0.7 to 16 g-m$^{-2}$ for spiral spray applications, preferably between 0.7 and 8 g-m$^{-2}$, more preferably between 1 and 6 g-m$^{-2}$, and most preferably between 3 and 6 g-m$^{-2}$. The adhesive typically is combined with the film or fabric by delivering the materials at an adhesive melt application temperature to effectively bond the film to fabric.

The hot melt adhesive of the invention is applied to the substrate at application temperatures typically employed in the application of hot melt adhesives. Thus, 150° C. is a typically employed temperature for application of the adhesives of the invention. Viscosity of the formulation is about 7500 cP at 150° C., which is a value typically found for many hot melt adhesives; thus, no special equipment or application parameters are required to use the adhesive.

The adhesive composition can be used as a novel spray-on adhesive composition, though the adhesive may be applied using any of the commonly employed methods of applying hot melt adhesives. The adhesive is made from a high melt index polymer and a high melting rosin ester tackifier component that interacts to produce a composition having excellent initial and long-term adhesion and low odor, is non-tacky, hot melt adhesive material that can be used in disposable article manufacture.

The method of assembling a disposable article of the invention contemplates joining a film layer or other substrate layer to a second layer that can be a permeable layer using an adhesive composition of the invention. The permeable layer can comprise an absorbent, a cellulosic tissue, a woven or non-woven fabric or other thin, flexible, porous or wettable sheet-like material. The tissue layer is a well known, typically loosely formed cellulosic sheet of high porosity or permeability. The fabric layer consists of a fluid permeable flexible material that can be made of either hydrophilic or hydrophobic fiber components. Woven and non-woven webs comprising the fabric can comprise natural or synthetic fibers or mixtures thereof. Woven and non-woven materials are well known and their construction methods have been practiced for many years. Woven fabrics are typically manufactured in weaving machines forming an interlocking mesh of fibers forming the layer. Non-woven fabrics can be made through a dry-laid or wet-laid method in carding processes, air laying processes or spun bond processes to produce a web that is mechanically, chemically or thermally formed. The fabric layers for use in the compounds and articles of this invention typically have a basis weight in the range of about 10 to 25, preferably 14 to 18 grams per square yard, a minimum dry tensile strength of at least 800 $g\text{-}cm^{-2}$ in the machine direction, and at least 200 grams per $cm^2$ in a cross machine direction. Synthetic materials commonly used in forming the fabric top sheets include rayon, polyester, polypropylene, polyethylene, nylon and others.

The substrate materials that can be used in the manufacture of the disposable articles of the invention, in combination with the tissue or woven or non-woven fabric, comprises any typical substrate used in the manufacture of disposable articles including films, sheets, elastics, absorbents, cellulosic fluffs or fill, other tissue, woven or non-woven fabrics, etc.

Absorbent layers can be adhered to other substrates using the adhesives of the invention. Such absorbent layers can comprise cellulosic pulp or fluff. Such fluff layers are often formed and wrapped in tissue to provide mechanical integrity to the fluff which has little inherent integrity. Fluff is typically manufactured through formation of cellulosic fibers. However, other materials can be utilized to form high absorbent fluff or pulp layers.

Elastic bands or elements can be used in the manufacture of the disposable articles of this invention.

The film or sheet-like layer used in the invention comprises a flexible sheet-like or film substrate. Such films are typically manufactured from thermoplastic resins and take the form of a thin layer having a typical thickness of about 0.01 to 0.05 mm (0.5 to 2.0 mils). Such films comprise polyethylene, polypropylene, ethylene-propylene copolymers, ethylene acrylate copolymers, ethylene vinyl acetate copolymers, polyvinyl chloride polymers, polyvinylidene chloride polymers, polyester polymers and others. Such films can be perforate or imperforate. In addition to the above materials used in the composite articles of the invention, a variety of other materials can be used, including other wrapping materials, deodorants, perfumes, dyes, and decorative appliqués, which provide further absorbency, instructional legends, and aesthetically pleasing appearances or scents.

In somewhat greater detail, the adhesives of the invention can be used in the manufacture of disposable articles including disposable diapers, incontinent devices or diapers, toilet training pants, feminine pads, and disposable bed pads by adhering a porous layer to a substrate. The assembly operations that deserve note include adhering a porous non-woven layer to a back sheet and adhering a tissue layer to an absorbent core.

In the manufacture of absorbents for disposables, it is common to wrap loosely assembled fluff or batts of absorbent material within a tissue overwrap. In such manufacture, the tissue surrounds the absorbent material in an overlapping fashion such that the spray-on adhesive can be applied to the overlap area, causing the adhesive to penetrate the overlap to contact the underlying fluff or batt. The spray-on adhesive in contact with the tissue and absorbent material forms a strong mechanical bond which maintains the tissue wrap and provides mechanical support and integrity to the underlying fluff or absorbent batt material. As a result of using the manufacturing techniques of the invention, the tissue-covered absorbent material obtains substantial mechanical integrity from the adhesive and tissue structure. During use, the tissue and adhesive maintains the fluff or batt in place and prevents movement of the absorbent material resulting in an inappropriate segregation of absorbent material in a small portion of the absorbent article. Such mechanical integrity insures that the absorbent material stays in place to provide absorbency and protection.

In the manufacture of composite articles, the fluid permeable fabric top sheet is adhered to a film back sheet. An absorbent layer can be introduced into the space between the fabric layer and the back sheet. Typically a fluid in contact with the fabric layer passes through the fabric layer and is absorbed and held within the absorbent layer. The absorbent core typically comprises a highly porous, highly absorbent loosely contacted fluff, wrapped or encased within a tissue cover. The absorbent fluff typically has little mechanical integrity. The tissue wrap or cover, once adhered to the fluff, provides the absorbent layer with substantial dimensional integrity preventing the absorbent material from migrating or collecting in an inappropriate portion of the diaper. The tissue wrap ensures that the absorbent material remains evenly distributed within the envelope created by the back sheet and the fabric layer. The manufactured diaper or the components of the diaper can have elastic bands or segments adhesively attached to provide security for the wearer. Such elastic bands create a snug fit at the waist and the leg apertures of the disposable articles. The adhesive compositions of the invention can be used to form bonds between the surfaces of the film materials between apertured films and non-apertured films, between tissue and non-woven or woven fabric layers, between absorbent fluff and tissue overwraps, and between elastic bands or elements and any structural component of the disposable diaper.

In construction methods for the preparation of the disposable articles of the invention, the adhesives are typically applied from spray heads that deliver the adhesive at elevated temperatures typically above about 121° C. and typically in the range of 135°-200° C. The spray heads have apertures that range from about 0.025 to about 0.102 cm. Under the operating conditions of typical adhesive spray machines, the diameter of the sprayed adhesive fiber can range from the size of the aperture to as little as about 0.002 cm depending on operating conditions. Depending on the end use and final bond strength desired, the adhesive can be used at application amounts that range from 0.78 grams per square meter ($g\text{-}m^{-2}$) to as much as 15.5 $g\text{-}m^{-2}$. Preferably, the adhesives can be used at an application rate of from about 0.78 $g\text{-}m^{-2}$ to 7.75 $g\text{-}m^{-2}$. More preferably, in disposable diaper constructions the adhesive of the invention is used at an application rate of about 1.5 to about 6 $g\text{-}m^{-2}$. Most preferably, in disposable diaper constructions the adhesive of the invention is used at an application rate of about 3.0 to 6.0 $g\text{-}m^{-2}$.

During the manufacture of disposable articles using the adhesives of the invention, two modes of application are preferred. One mode of operation involves spraying the adhesive upon a fabric, such as a tissue, a woven or non-woven web, or other material having permeability to the adhesive. Such sprayed-on adhesive can penetrate the permeable tissue, non-woven or woven fiber, to cause the sheet to be embedded in the adhesive and adhered to the substrate such as an absorbent layer, back layer, or film. Alternatively, the adhesives of the invention can be directly applied to back sheet or film and the tissue, woven or non-woven fabric, or other material can be applied to the adhesive on the film. The melt adhesive retains sufficient open time that it can penetrate pores or apertures in the fabric to form a mechanical bond. In the manufacture of tissue fluff absorbent cores, the fluff is typically wrapped by tissue. The tissue layer can be wrapped around the fluff and can overlap. Adhesive can then be sprayed on the overlapping portion of tissue outerwrap, can penetrate the wrappings and adhere the tissue to the fluff ensuring that the fluff obtains dimensional stability from adherence to the outer wrap.

The hot melt adhesives of the invention are made in common hot melt manufacturing equipment. In the manufacture of the hot melt adhesives of the invention, the EVA copolymer is typically added to the molten pentaerythritol ester of rosin. The EVA copolymer is then blended with the rosin to form a smooth, uniform mixture. No inert atmosphere is required. Alternatively, the rosin ester is added directly to the manufacturing equipment under inert atmosphere and is heated and agitated until melted. The EVA copolymer is then added to the melt at a rate such that the mixture forms a uniform smooth blend within a reasonable period. Antioxidant materials used in the manufacture of the adhesive can be added to the melt prior to, with, or after the addition of the polymer. Once the uniform blend of all the adhesive ingredients is formed, the adhesive can be drawn off and packaged in a convenient form including in drums, blocks, pillows, pellets, granules, etc.

The following examples provide non-limiting additional information with respect to the manufacture of the adhesives of the invention and include the best mode.

EXPERIMENTAL SECTION

Experimental Procedures

1. Viscosity

Viscosity measured was Brookfield viscosity. Brookfield viscosity is measured at 150° C. with spindle #27 at 5 RPM on a Brookfield viscometer (ASTM D3236).

2. Volatility

Volatile organic chemicals (VOCs) diffusing from the adhesives was measured at 150° C. for 20 g samples of each of the adhesive formulations. Using this technique VOCs after 24 and 48 hours at temperature is measured by weight loss.

3. Thermal Stability

Thermal stability as manifested by a change in viscosity over time at elevated temperature was measured by measuring the Brookfield viscosity initially at 150° C. and comparing to the viscosity at 150° C. after 72 hours of being held at that temperature in air. An increase in viscosity may mean a higher degree of polymerization, volatilization of plasticizing agents, crosslinking, or some other chemical or physical change caused by subjecting the adhesives to the extended period at elevated temperature.

4. Adhesion

Adhesion of the adhesives was measured using industry standardized testing. In what is commonly known as the "T-peel" test, an olefin/nonwoven lamination bonded with a ¾" wide spiral spray pattern is peeled at a 90 degree angle at 12 inches/minute and the resulting force measured. The average peel force is reported in grams.

Example 1

A 60:40 blend of EVA and pentaerythritol ester of rosin, designated as AL-2002, was made as follows. Rosin ester, 800 grams was weighed into a one gallon, unlined steel can and heated in an oven set at about 150° C. until melted. The can with molten rosin ester was placed in a mantle beater and the temperature maintained at about 150° C. EVA, 1,200 grams, was slowly added and dissolved in the molten rosin ester with agitation using a Calframo mixer and stirrer (available from ESP Chemicals of Tucson, Ariz.). Two of the control samples used were commercially available hot melt pressure sensitive adhesive formulations HL-1358 and D-3166, both available from the H. B. Fuller Co. of St. Paul, Minn.

A control sample was a non-tacky, pelletizable hot melt adhesive formulation prepared according to the teachings of Quinn, U.S. Pat. No. 6,846,876, which is incorporated herein in its entirety. The adhesive formulation was blended according to the procedure used in Quinn and is referred to as AL-2005. The components of AL-2002 and AL-2005 are shown in Table 3 below.

TABLE 3

Components of control samples formulated according to U.S. Pat. No. 6,846,876.

| Sample | Component | Wgt % |
|---|---|---|
| AL-2002 | Elvax ® 205W (DuPont Co. of Wilmington, DE) | 60 |
|  | Sylvalite ® RE 110L (Arizona Chemical, Jacksonville, FL) | 40 |
| AL-2005 | Affinity GA-1900 (Dow Chemical) | 60 |
|  | Escorez 5637 (ExxonMobil Chemical) | 40 |

Example 2

The adhesion performance of AL-2002 was compared to that of HL-1358, D-3166 and AL-2005.

The formulations were applied to a substrate for testing as follows. A coating weight of about 5 g/m$^2$ over a pattern width of 20 mm was applied to Clopay DH-203 25.4 μm embossed polyethylene (available from the Clopay Company of Mason, Ohio) using 0.46 millimeter Nordson spiral spray nozzles (available from the Nordson Corporation of Westlake, Ohio) to spray each adhesive at 150° C. at a web speed of about 152 meters/minute. The polyethylene bearing the adhesive was subsequently laminated to BBA Style 717D spunbond nonwoven (16.9 g/m$^2$, available from BBA Nonwovens of London, UK). After spraying and lamination the adhesives were allowed to cool to ambient temperature before testing was commenced.

Initial adhesion was tested using the T-peel method described above. Some samples were then heat aged in air for 14 days at 49° C. and retested. The results of testing before and after heat aging, and percent change in adhesion, is shown in Table 4.

TABLE 4

T-peel adhesion before and after heat aging.

| Test | AL-2002 | AL-2005 | HL-1358 | D-3166 |
|---|---|---|---|---|
| Average Initial T-Peel @ RT, g | >440 g* | 148 | 142 | 149 |

TABLE 4-continued

T-peel adhesion before and after heat aging.

| Test | AL-2002 | AL-2005 | HL-1358 | D-3166 |
|---|---|---|---|---|
| Average Initial T-Peel @ 37.7° C., g | 115 | 101 | 112 | 138 |
| Average Aged T-Peel @ RT, g | >300 g* | 152 | 359 | 351 |
| % change in adhesion, before vs. after aging | NA | 3% | 153% | 136% |

*Actual value cannot be measured because substrate failed instead of adhesive

AL-2002 exhibits excellent adhesion both initially and after heat aging. Adhesion of AL-2002 measured at ambient temperature exceeded both comparable non-tacky hot melt adhesives and pressure sensitive adhesives suitable for use in a disposable article such as a diaper. AL-2002 was the only adhesive that caused substrate failure before failure of the adhesive in the test. Substrate failure was observed both before and after heat aging. In addition, AL-2002 shows acceptable adhesion at elevated temperature (37.7° C.).

Example 3

VOC content for all adhesive formulations was measured by subjecting 20 g of adhesive to a through-air circulating oven set at 150° C. for 24 hours and measuring the weight loss after the heating cycle. The test was repeated after an additional 48 hours at 150° C. in air. The results of weight loss testing are shown in Table 5.

TABLE 5

Measurement of VOCs, as determined by weight loss of 20 g of adhesive at 150° C.

| Weight Loss @ 150° C., wgt % | AL-2002 | AL-2005 | HL-1358 | D-3166 |
|---|---|---|---|---|
| After 24 hours | 0.50 | 0.18 | 5.0 | 5.5 |
| After 48 hours | 0.91 | 0.38 | 8.0 | 8.4 |

Notably, AL-2002 has very low volatile content, comparable to other non-tacky hot melt compositions and superior to pressure sensitive formulations that are commercially available. VOCs at the application temperature are particularly important with respect to operating conditions e.g. in factories where disposable items are manufactured and adhesives are applied.

Example 4

Thermal stability of formulations in the melt is manifested in stable viscosity over time at elevated temperature. Thus, Brookfield viscosity was measured at 150° C. for all samples initially, and again after 72 hours in air at 150° C. Comparison of initial viscosity and viscosity after heat aging is shown in Table 6.

TABLE 6

Viscosity at 150° C. before and after heat aging.

| Brookfield η, cPs, @ 150° C. | AL-2002 | AL-2005 | HL-1358 | D-3166 |
|---|---|---|---|---|
| Initial | 7580 | 7125 | 3050 | 5175 |
| After 72 hours | 7820 | 7250 | 1200 | 7125 |
| % change | 3 | 1.2 | −61 | 38 |

Notably, AL-2002 exhibits very good thermal stability when compared to many other adhesive compositions, including compositions that are commercially available.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A disposable article comprising a film layer bonded to a permeable layer using a hot melt construction adhesive at an adhesive coating weight of between about 0.7 and 16 gm-m$^{-2}$, the construction adhesive consisting essentially of:
    (a) about 60 wt % poly(ethylene-co-vinyl acetate) having about 28 wt. % vinyl acetate and a melt index of about 800 gm-10 min$^{-1}$ when measured according to ASTM-D1238; and
    (b) about 40 wt % of a rosin ester;
    wherein the adhesive composition has improved VOC release and improved thermal stability when compared to conventional adhesive and an initial T-peel adhesion under ambient conditions of greater than 400 g;
    wherein the adhesion of the composition does not change substantially after at least about 14 days at about 49° C.; and
    wherein the viscosity of the composition is stable for at least about 72 hours at about 150° C.

2. The disposable article of claim 1 wherein the adhesive composition is coated onto the article at a coating weight of between about 0.7 to 8 g-m$^{-2}$.

3. The disposable article of claim 1 wherein the adhesive composition is coated onto the article at a coating weight of between about 1 and 6 g-m$^{-2}$.

4. The disposable article of claim 1 wherein the adhesive composition is coated onto the article at a coating weight of between about 3 and 6 g-m$^{-2}$.

5. The disposable article of claim 1 wherein the adhesive composition is coated onto the article at a temperature of about 150° C.

6. The disposable article of claim 1 wherein the article is a diaper.

7. The composition of claim 1 wherein the rosin ester is a pentaerythritol rosin ester.

8. The composition of claim 1 wherein the rosin ester is a glycerin rosin ester.

9. The composition of claim 1 wherein the rosin ester is an ester comprising a mixture comprising glycerin rosin ester and pentaerythritol rosin ester.

10. The article of claim 1 wherein the permeable layer is a nonwoven layer.

11. A method of assembling a disposable article comprising bonding a film layer bonded to a permeable layer using a hot melt construction adhesive at an adhesive coating weight of between about 0.7 and 16 gm-m$^{-2}$, the construction adhesive consisting essentially of:
    (a) about 60 wt % poly(ethylene-co-vinyl acetate), having about 28 wt. % vinyl acetate and a melt index of between about 800 gm-10 min$^{-1}$ and 1000 gm-10 min$^{-1}$ when measured according to ASTM-D1238; and
    (b) about 40 wt % of a rosin ester having a softening point of greater than about 100° C.;
    wherein the adhesive composition has improved VOC release and improved thermal stability when compared to conventional adhesive and an initial T-peel adhesion under ambient conditions of greater than 400 g;

wherein the adhesion of the composition does not change substantially after at least about 14 days at about 49° C.; and wherein the viscosity of the composition is stable for at least about 72 hours at about 150° C.

12. The composition of claim 11 wherein the rosin ester is a glycerin rosin ester or pentaerythritol rosin ester.

13. The composition of claim 11 wherein the rosin ester is an ester comprising a mixture comprising glycerin rosin ester and pentaerythritol rosin ester.

* * * * *